C. A. GRISWOLD.

CORSETS.

No. 7,895. Reissued Sept. 25, 1877.

Witnesses:

Theodore L. Foster,

A. S. Fitch.

Inventor:

Nathaniel A. Griswold

By J. P. Fitch

Atty

UNITED STATES PATENT OFFICE.

CATHARINE A. GRISWOLD, OF NEW YORK, N. Y.

IMPROVEMENT IN CORSETS.

Specification forming part of Letters Patent No. 116,585, dated July 4, 1871; Reissue No. 7,895, dated September 25, 1877; application filed August 30, 1877.

*To all whom it may concern:*

Be it known that I, CATHARINE A. GRISWOLD, of the city, county, and State of New York, (formerly of Willimantic, Connecticut,) have invented certain new and useful Improvements in Corsets; and I do hereby declare the following to be a full, clear, and exact description of the same, reference being had to the accompanying drawing, which forms a part of this specification, and in which—

Figure 1:
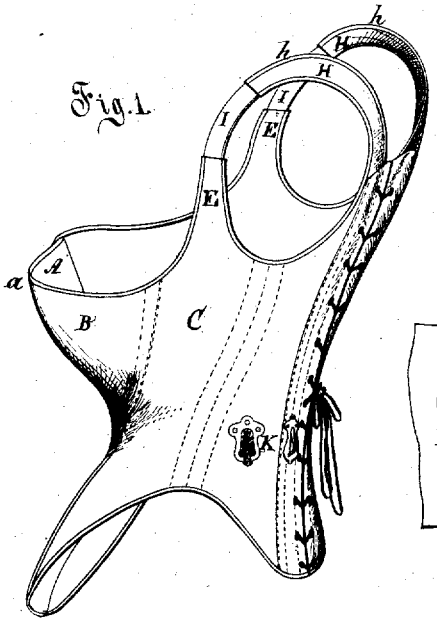
Figure 3:
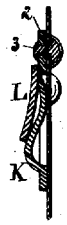
Figure 2:
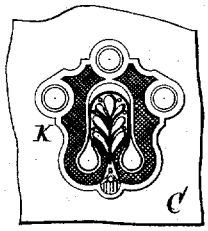
Figure 4:
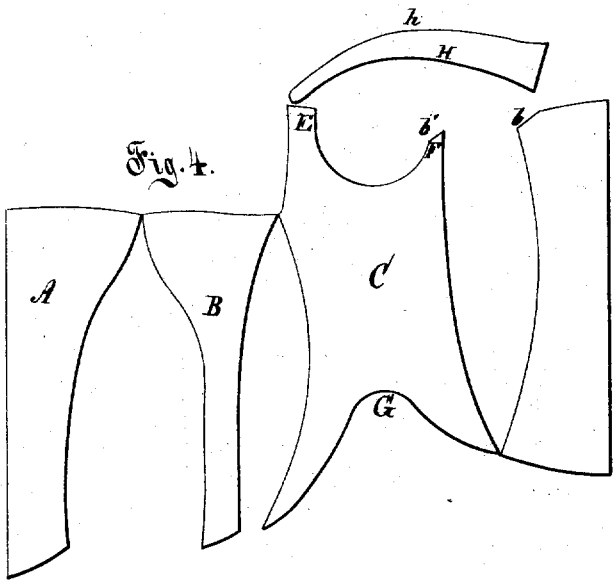

Figure 1 represents a perspective view of my improved corset. Fig. 2 represents a front view of one of the skirt-supporting hooks. Fig. 3 represents a central section of one of the skirt-supporting hooks, and Fig. 4 represents the form of the pieces from which the corset is made.

To enable those skilled in the art to which my invention belongs to make and use the same, I will describe it in detail.

The nature of my invention consists in the improvements in corset, as hereinafter described.

In the drawings, the parts marked A B C D represent the pieces from which each half of the corset is composed, A indicating the first piece at the front, and D the piece at the back. The first two pieces, A and B, are formed wide at the top and narrow at their central and lower portions, thus allowing, when the parts are put together, the peculiar fullness at the breast *a*. The side piece C is cut with an upward projection, E, at its upper front corner, and with a less projection at its upper rear corner F, the upper corner being slanted off, as shown at *b*, while its lower edge is scalloped out in the form shown at G, to allow space for the hip of the wearer. The back piece D is formed, preferably, longer at the top than in ordinary corsets, its upper portion extending above the projection F of the side piece C, and its forward corner slanted off, as shown at *b*, to enable the top lines *b b* of the two pieces to coincide. A shoulder-strap, H, is attached to the slanted portion *b b* of the pieces C D, which strap extends over the shoulder of the wearer, and may be joined by means of a section of elastic braid or tape, I, to the upper extremity of the upward projecting portion E of the side piece C, in the manner fully illustrated in Fig. 1.

The shoulder-straps are cut curving, as shown at H, Fig. 4, so as to fit smoothly to the form of the shoulder, while the peculiar formation of the top of the side pieces C, with their extending portions E drawn up by the shoulder-strap elastics I, form arm-sizes, and support the breast and sides of the wearer in a very perfect and graceful manner.

The halves of the corset are joined to each other by lacings at the back, as indicated, steel or other metallic springs or braces being arranged in the rear edge of each half. These springs are provided with eyelet-holes, and after the springs are arranged in proper position within the fabric of the corset, eyelets are set through the cloth and springs to receive the lacings. The front edges of the halves are furnished with the ordinary springs and clasps, which secure the corset about the waist of the wearer, as usual, while a suitable number of springs or braces are arranged at different positions in the body of the corset to produce the required support for the body.

Skirt-supporting hooks K may be secured to the waist of the corset at its sides and back in the positions indicated. The hooks may be formed from sheet metal, the points 1 being cut and thrown up from the center of the attaching-plates 2, in the form shown. The hooks may be attached to the body of the corset by means of metallic rivets. When rivets are used, their heads, which rest against the inner side of the corset and next to the body of the wearer, may be covered with cloth, so as to form a smooth and desirable finish. The belts of the under garments and skirts may be furnished with small loops to pass over the hooks K, and thereby support said garments.

The shoulder-straps H being cut curving, as before described, their inner edges *h h* are elevated above their outer edges in the manner fully shown in Fig. 1, so that when applied to the person there is no binding, chafing, or cutting of the arms or shoulders. This feature will be appreciated by those skilled in the art to which my invention belongs.

It is evident that these straps may be adapted to fit the varying forms of wearers by varying the curve of the strips forming the straps.

It will be observed that the projections E E′ extend upward above the upper edge of the front of the corset on each side of the bust. They serve an important purpose, namely, that of affording a side support to the bust of the wearer, and as points of attachment of the shoulder-straps.

Having thus described my improvements in corsets, what I claim therein as new and of my invention, and desire to secure by Letters Patent, is—

1. As an improved article of manufacture, a corset provided with shoulder-straps, curved so that their inner edges are elevated above their outer edges, as and for the purpose specified.

2. As an improved article of manufacture, a corset having projecting from its upper edge on each side, in front of the arms, extensions E E′, constructed substantially as shown, to serve as yielding flexible side supports for the bust of the wearer, and as a point of attachment of shoulder-straps, as and for the purpose described.

CATHARINE A. GRISWOLD.

Witnesses:
A. S. FITCH,
WM. T. FARNHAM.